No. 836,256. PATENTED NOV. 20, 1906.
J. HICKEY.
AUTOMATIC DRYING, FEEDING, AND CINDER REMOVING APPARATUS
FOR ORE FURNACES.
APPLICATION FILED DEC. 4, 1903.

Witnesses:
Horace A. Crossman.
Evintt S. Emery.

Inventor:
John Hickey
by Emery Booth & Powell
Attys.

No. 836,256. PATENTED NOV. 20, 1906.
J. HICKEY.
AUTOMATIC DRYING, FEEDING, AND CINDER REMOVING APPARATUS
FOR ORE FURNACES.
APPLICATION FILED DEC. 4, 1903.

Witnesses:
Horace A. Crossman.
Everitt S. Emery.

Inventor:
John Hickey.
by Emery, Booth & Powell
Attys.

No. 836,256. PATENTED NOV. 20, 1906.
J. HICKEY.
AUTOMATIC DRYING, FEEDING, AND CINDER REMOVING APPARATUS
FOR ORE FURNACES.
APPLICATION FILED DEC. 4, 1903.

Witnesses:
Horace A. Crossman.
Everett S. Emery.

Inventor:
John Hickey.
by Emery, Booth & Powell
Attys.

No. 836,256. PATENTED NOV. 20, 1906.
J. HICKEY.
AUTOMATIC DRYING, FEEDING, AND CINDER REMOVING APPARATUS
FOR ORE FURNACES.
APPLICATION FILED DEC. 4, 1903.

Witnesses:
Horace A. Crossman.
Everett S. Emery.

Inventor:
John Hickey.
by Emery, Booth & Powell
Attys

UNITED STATES PATENT OFFICE.

JOHN HICKEY, OF BUFFALO, NEW YORK, ASSIGNOR OF FIFTY-FIVE ONE-HUNDREDTHS TO THE AMERICAN AGRICULTURAL CHEMICAL COMPANY, OF NEW LONDON, CONNECTICUT, A CORPORATION OF CONNECTICUT.

AUTOMATIC DRYING, FEEDING, AND CINDER-REMOVING APPARATUS FOR ORE-FURNACES.

No. 836,256.      Specification of Letters Patent.      Patented Nov. 20, 1906.

Application filed December 4, 1903. Serial No. 183,700.

*To all whom it may concern:*

Be it known that I, JOHN HICKEY, a citizen of the United States, and a resident of Buffalo, in the county of Erie and State of New York, have invented an Improvement in Automatic Drying, Feeding, and Cinder-Removing Apparatus for Ore-Furnaces, of which the following description, in connection with the accompanying drawings, is a specification, like letters on the drawings representing like parts.

In the manufacture of phosphate fertilizers sulfuric-acid gas is employed, which is obtained from a sulfur-bearing ore. This ore is received in a more or less pulverized or finely-divided form and is usually damp or wet from exposure and must be dried for the best results before it is passed through usual furnaces or burners for the freeing of the gas therefrom. The ash or cinder remaining after the extraction of the gas from the ore requires to be removed from time to time or continuously for obvious reasons.

Prior to my invention it has been customary to dry the ore preliminarily either by spreading it in the sun or by passing it through a drying apparatus especially constructed for the purpose and in no wise connected with the means for supplying the burners or furnaces. Similarly it has also been the custom prior to my invention to remove the cinder from the furnaces or burners by hand. All of this involves a useless expenditure of time and labor, which adds to the cost of production of the fertilizer.

My invention aims to provide means for automatically drying the ore, for feeding the dried ore to the burners or furnaces, and for removing to the desired point the cinder or ash remaining after the desired gas has been extracted therefrom.

My invention will best be understood from a description of the best embodiment thereof yet devised by me, it being understood, however, that my invention is not limited to the particular embodiment thereof selected for this disclosure.

In the drawings accompanying this description Figure 1 in vertical longitudinal section illustrates a typical arrangement of burner equipped with apparatus illustrating my invention. Fig. 10 is a sectional detail, on an enlarged scale, of the drier-supply hopper and the reciprocating table.

Figures 1, 10:
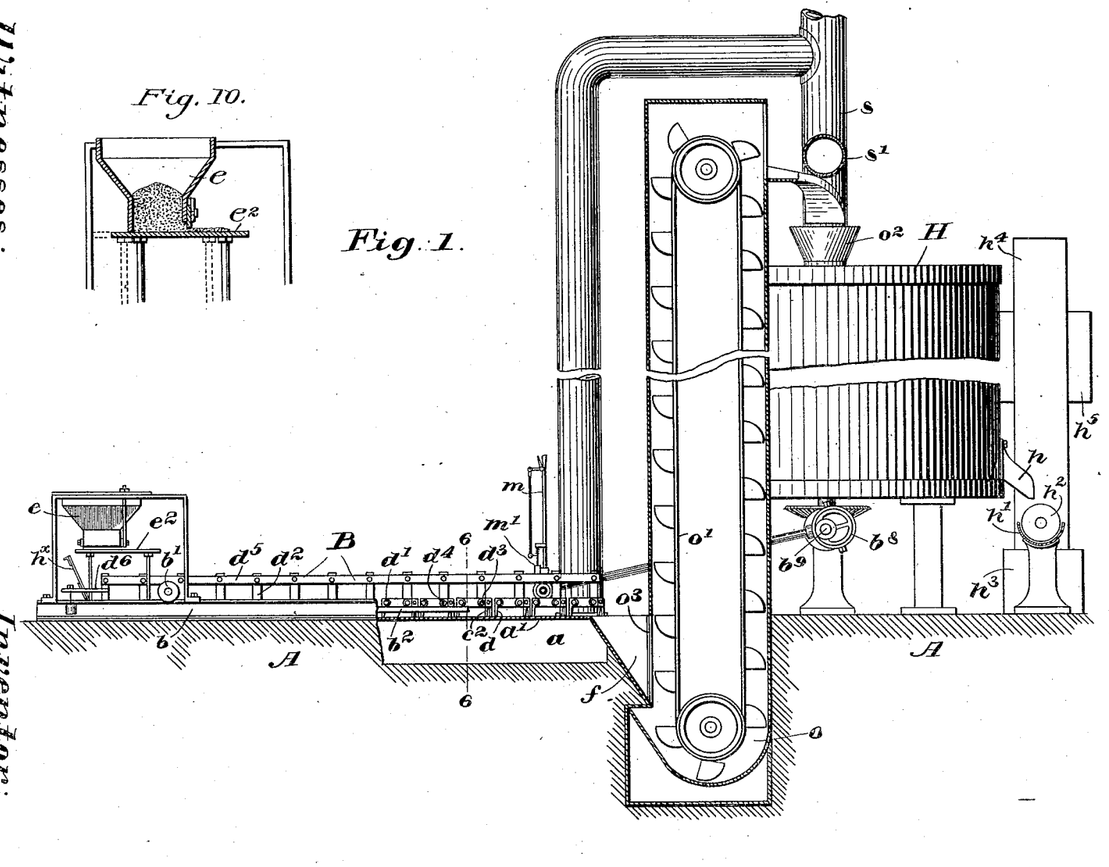
Figure 2:
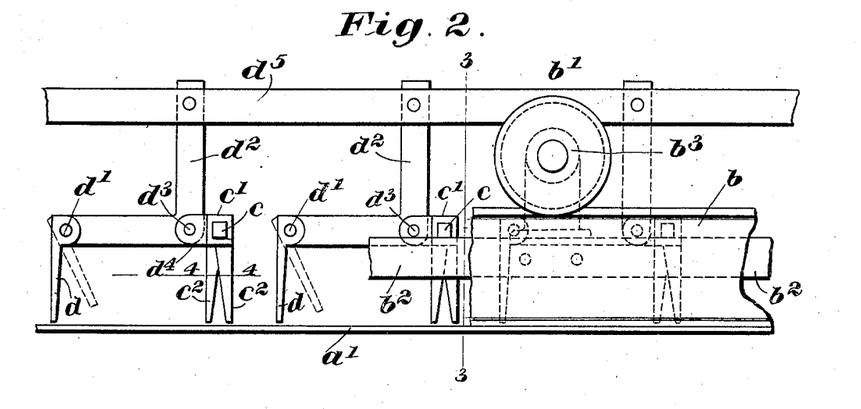
Fig. 2 is a detail, on an enlarged scale, showing in side elevation partially-broken away parts of the drying apparatus.
Figure 3:
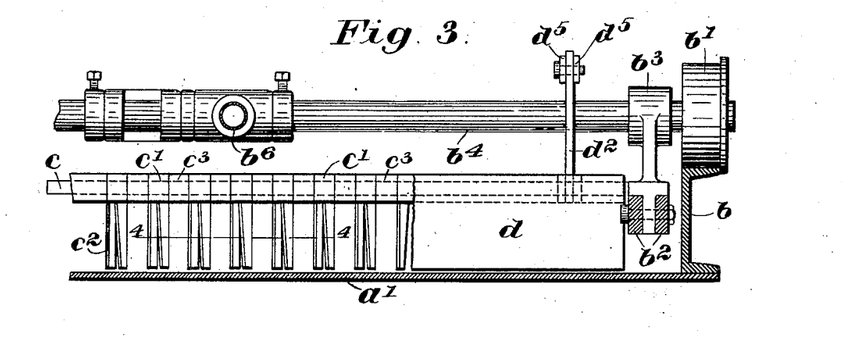
Fig. 3 is a vertical section on the dotted line 3 3, Fig. 2, partially broken away.
Figure 5:
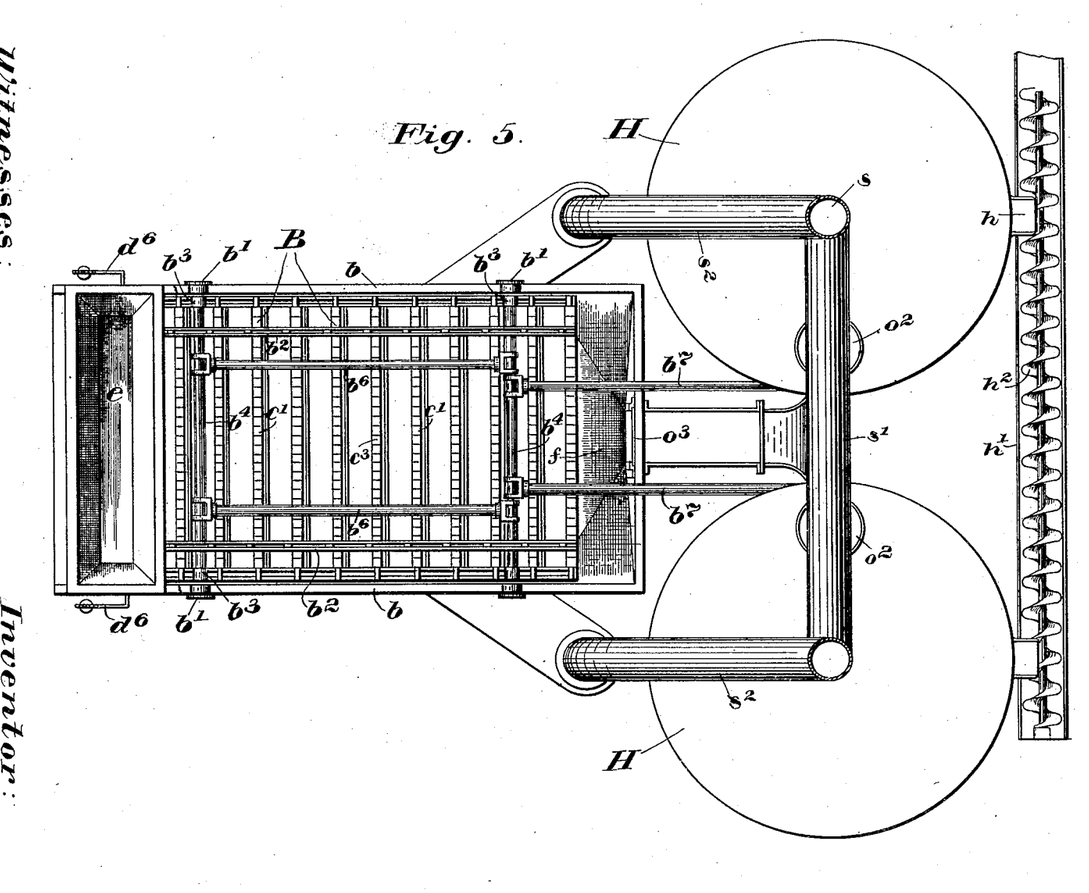
Fig. 5 is a top or plan view of the apparatus shown in Fig. 1.
Figure 7:
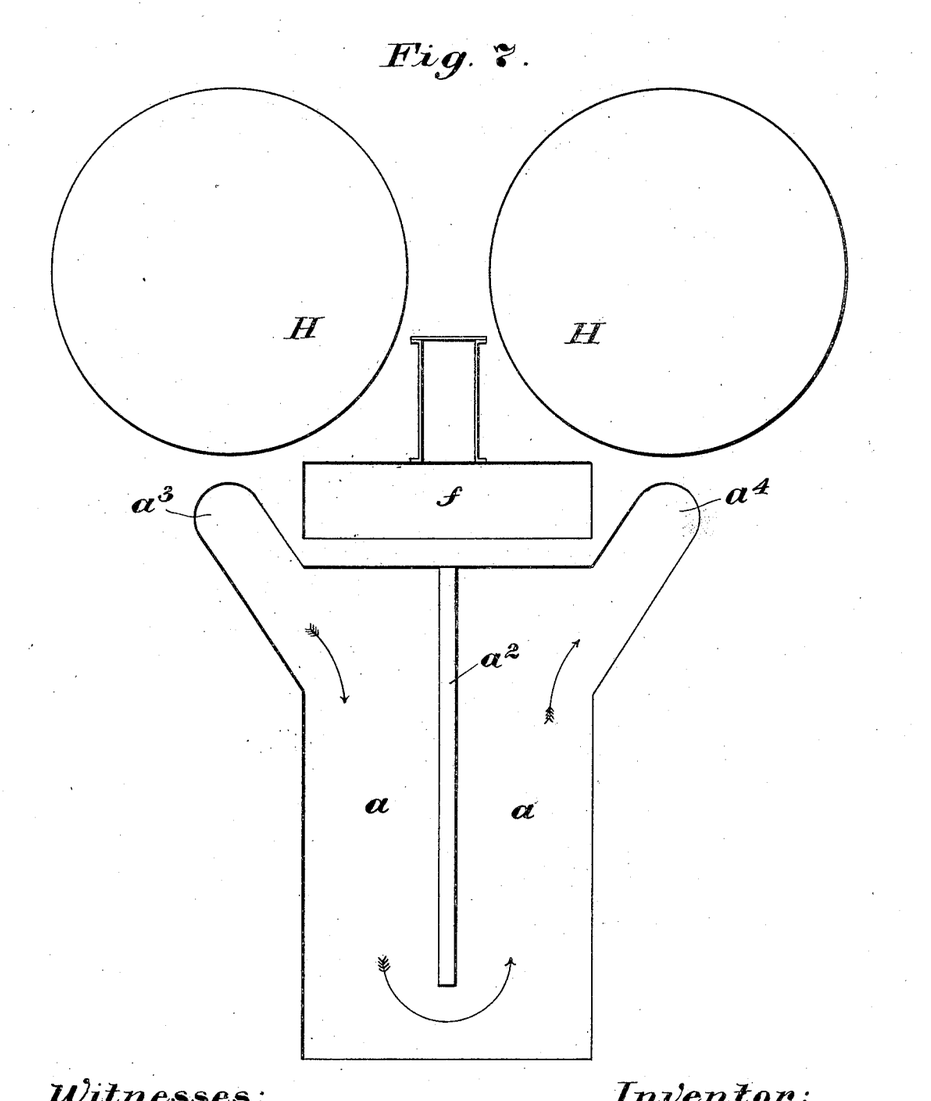
Fig. 7, a plan showing the outline of the drier-pit, in connection with which I am about to disclose my invention.
Figure 8:
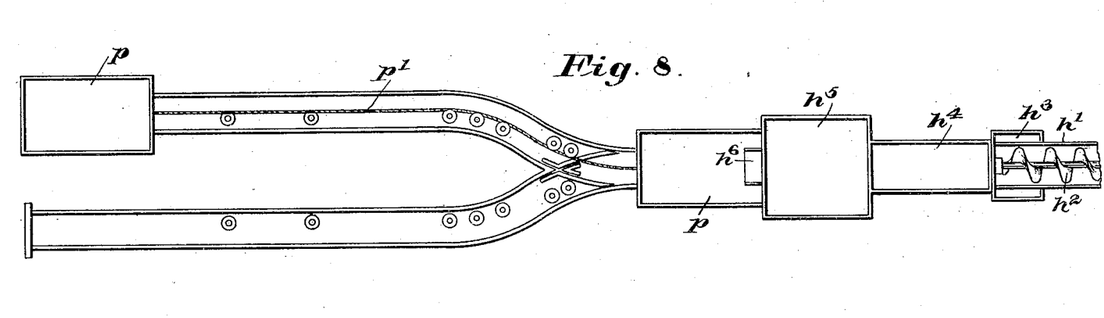
Fig. 8, a plan view showing one arrangement of tracks for delivery-cars.

In the particular embodiment of my invention selected for illustration herein and shown in the drawings, referring first to Figs. 1 and 5, A indicates a suitable concrete or other floor of the building in which the apparatus is located. In this floor is constructed a pit $a$, (see Fig. 7,) covered by a metal plate or table $a'$. (See Fig. 1.) This pit is shown partially divided along its middle by a partition $a^2$, so that hot products of combustion or other heating medium admitted— for instance, at the point $a^3$—is caused to circle around or through substantially the entire chamber before it can take its exit at $a^4$, thus to insure full heating of the table $a'$.

Along the edges of the sheet-metal table $a'$ are arranged two parallel channel-irons $b$ $b$, which serve as tracks for the wheels $b'$ of the drier-carriage B. This drier-carriage comprises the parallel side bars $b^2$, to which are secured the bearing-brackets $b^3$, and through these brackets are passed the axles $b^4$, upon the ends of which said wheels $b'$ are journaled. The axles $b^4$ may conveniently be of gas-pipe, and they may be connected by gas-pipe connecting rods or members $b^6$. (See Fig. 5.) This frame may be reciprocated in suitable manner, I having found it convenient to connect the same by a pair of gas-pipe connecting-rods $b^7$ with an eccentric $b^8$ on a shaft $b^9$, which drives the stirrers or agitating devices within the Herreschoff or equivalent burners or furnaces H H, so that the same power which operates the burners may also operate the drying apparatus.

Figure 4:
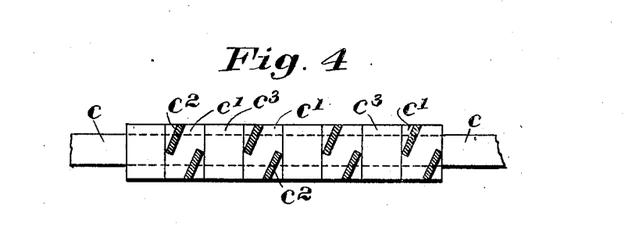
Fig. 4 is a horizontal sectional detail on the dotted line 4 4, Fig. 3, looking upward.

The side frame members $b^2$ of the drier-frame are connected by a series of parallel cross-rods $c\ c$. These rods are preferably of non-circular cross-section—as, for instance, square—and upon them are slid in desired number the ore-shifter heads $c'$, each of which is provided with one or more, preferably two, diagonally-placed depending fingers $c^2$, which resemble in appearance the blades of propellers. (Best shown in Fig. 4.) As the drier-frame is reciprocated over the drier-table $a'$ these propeller-like shifting-fingers in passing through the ore upon the said table cause the ore to be shifted or turned first to the right and then to the left, according to the direction of reciprocation, thereby turning the ore over and over, so as to present at each reciprocation new particles thereof to the action of the heated table and to the atmosphere for the more effectual drying of the ore.

To feed the ore gradually from one end of the drier-table to the other end thereof, I have provided a series of feeding-plates $d$, which extend transversely of the table and drier-frame and which depend, respectively, by pivots $d'$ from the horizontal arms of elbow-levers $d^2$. These elbow-levers are fulcrumed at $d^3$ in ears $d^4$, formed on the shifter-heads $c'$ or upon spacing-blocks interposed between the same and also mounted upon the cross-rods $c$. The vertical arms of these elbow-levers are connected, respectively, with rods $d^5$, which extend throughout the entire length of the drier-frame at each edge thereof, and the endmost levers are provided with weighted arms $d^6$, which act through the said rods $d^5$ to hold the entire series of elbow-levers in position with their respective depending feeding-plates in lowermost position close to the drier-table. As the drier-carriage reciprocates in one direction, as to the right, Fig. 1, the depending feeding-plates $d$ being prevented from turning on their pivots push before them the ore upon the table, moving the latter bodily for a distance represented by the length of travel of the carriage. On the return movement of the carriage said depending plates yield to the ore or material upon the table and swing clear thereof, leaving it in the position in which it was moved by the previous feeding movement, excepting as the ore is turned or moved laterally by the angular or propeller-like nature of the turning-fingers $c^2$. Thus at each reciprocation of the carriage in one direction the ore is fed bodily forward upon the table a distance corresponding to the travel of the carriage, and at each return movement of the carriage the ore is merely turned over laterally by the depending fingers to expose new parts to the action of the heat without disturbing the longitudinal position of the ore as left by the last feeding movement of the carriage. For example, if the length of the table is eight feet and the travel of the carriage at each reciprocation thereof is eight inches it would take twelve reciprocations to feed the material from one end of the table to the other, and between each of the twelve feeding movements there would be twelve periods of rest, during which the material would be merely turned over laterally for better drying thereof, and when the reciprocations are slow, as is usually the case, there is an appreciable period of rest at the end of each reciprocatory movement for further drying of the ore. Thus there is given ample time for thorough and effectual drying, coupled with a most complete shifting or turning over of the material, so that every part thereof shall be subjected to the drying action.

At the outer end of the drier-plate is a hopper $e$, which extends transversely for the entire width of the drier-carriage and is also preferably mounted to be adjustable along the said plate in the direction of the reciprocation of the said carriage. The bottom of this hopper is closed by a plate $e^2$, which is mounted and to reciprocate with the carriage. The rear and end walls of the hopper reach close to this movable plate $e^2$, while the front wall of the hopper terminates a short distance above said plate, the distance being preferably variable or adjustable in any suitable manner.

The material to be dried is deposited in this hopper and rests upon this reciprocable or movable plate $e^2$, and at each forward movement thereof as the carriage moves to the right, Fig. 1, said plate $e^2$, moving with said carriage, carries out from the bottom of the hopper a quantity of materials therefrom, which is immediately replaced by further material dropping down behind it upon said plate. The area of materials so taken from the hopper is that of the area of the hopper-outlet reaching across the carriage, and the depth of material so taken out depends upon the distance between the said table and the lower edge of the front hopper-wall. Upon return movement of the carriage no material can be removed from the hopper, because the rear wall thereof drops close to the table $e^2$, and the material in the hopper which has dropped down upon the plate behind that material which was taken out by the plate under the front wall now acts as a block against the return of the material so removed, causing the latter during this return movement of the table and carriage to be pushed off the front edge of the said table upon the drier-table, where it is subjected to the feeding and lateral shifting action above described. Thus it will be seen that the ore when once deposited in the hopper is at each reciprocation of the carriage fed or drawn therefrom in definite determinable quantity, is then deposited automatically upon the drier-table, and then gradually fed along and turned from side to side while in transit until it has been thoroughly dried, when it is finally fed off the end of the drier-table into a suitable receptacle therefor, which may be, and preferably is, a hopper $f$.

The various ores require to be dried through longer or shorter periods of time, and my invention readily admits of proper adjustment to this end by moving the hopper $e$ along the table into position where it will deposit the ore upon the drier-table at the proper point to give it the necessary time of travel to the delivery end of the drier-table, and this adjustment is easily and quickly made.

The transverse square rods $c$ may be filled in for their entire lengths with shifter-heads provided with depending propeller-like shifter-fingers, or finger-bearing heads may be spaced at greater or less distances one from the other, using intervening spacers $c^3$. In any event, however, the best results are attainable by staggering the depending fingers $c^2$ upon one bar with relation to those upon adjacent bars.

Referring to Fig. 1, at the rear end of the drier-table is an inclined deflector-plate $h^\times$, mounted upon the carriage and which acts to catch any material or ore which may have worked through to the rear of the plate $e^2$ and direct the same upon the drier-plate $a$. In a suitable position upon the carriage is mounted a hand-lever $m$, Fig. 1, which is suitably connected with both rods $d^5$, so that by throwing over said lever and locking it by a suitable locking device $m'$ for the purpose all the series of elbow-levers $d^2$ may be moved to lift all the feeding-plates $d$ away from the drier-table, and thereby stop further progress of material toward the hopper $f$ till it is sufficiently dry or until the time has arrived to deliver the same to the hopper. The time between distribution of material on the heater and its discharge therefrom may be used in stirring.

The operation of this apparatus may be so slow and so gradual and its motions and actions upon the material are of such a nature that little power is required for its operation, so that it may conveniently be connected with the operating-shaft for the Herreschoff burner or burners and operated therefrom without appreciable addition of load. The material is deposited in the hopper $e$ precisely as it would be deposited in a hopper to be fed to the burners, so that so far as attendance is concerned and, practically speaking, so far as power is concerned no additional cost is involved, and the ore is in every instance delivered to the burner or burners in a thoroughly-dried condition, in which it will best give off its acid in passing through said burners.

The dried materials which have been deposited in the hopper $f$ at the right, Fig. 1, may be permitted to pass therefrom at once or under proper control and at proper times into a conveyer-pit $o$, from which they are taken by a suitably-driven conveyer apparatus $o'$ to the tops of the burners and delivered thereto automatically through the hoppers $o^2$. A gate may be provided at $o^3$ for the control or flow of materials from the hopper $f$ into the conveyer-pit $o$.

Figure 9:
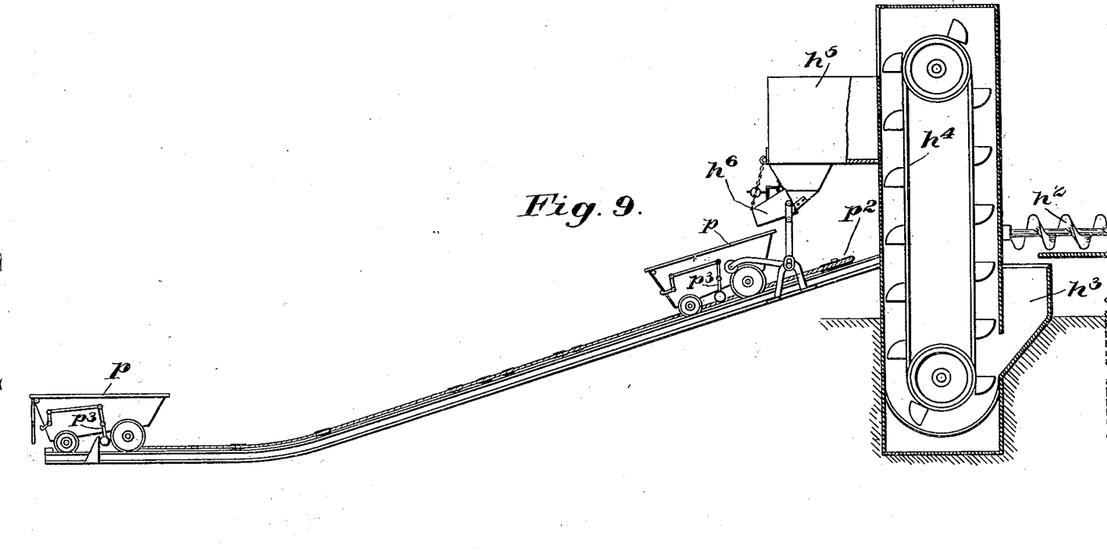
Fig. 9, a side view, partly in section, of Fig. 8.

Referring now particularly to Figs. 1 and 5, the cinder or ash remaining after the acid has been expelled from the ore in the burners H is discharged from the burners through spouts $h$ into the trough $h'$ of a screw conveyer $h^2$, which conveys said cinder or ash laterally to one side and deposits the same in a hopper or trough $h^3$, Fig. 1. From this hopper $h^3$ said cinder is lifted by a conveyer $h^4$ to a suitable elevation, where it is deposited in a receiving bin or hopper $h^5$ of suitable capacity. This storage-bin $h^5$ is provided with an outlet of usual or well-known automatically-discharging construction, typified at $h^6$, so that when either one of the cars $p$ $p$ in the course of its travel reaches a position beneath said outlet $h^6$ the latter will be engaged by the said car and operated to discharge sufficient of its contents only to fill the car. These two cars, as here shown, are connected by a cable $p'$ passing about a pulley $p^2$ adjacent said bin, whereby when one car is loaded it may gravitate out from under the bin $h^5$ and down the incline, (shown in Fig. 9,) and thereby return the other (now empty) car up said incline into filling position beneath said bin. Each of said cars is provided with automatic dumping means typified at $p^3$, which when the car reaches the end of its descent operates in usual manner to discharge the contents of the car.

Figure 6:
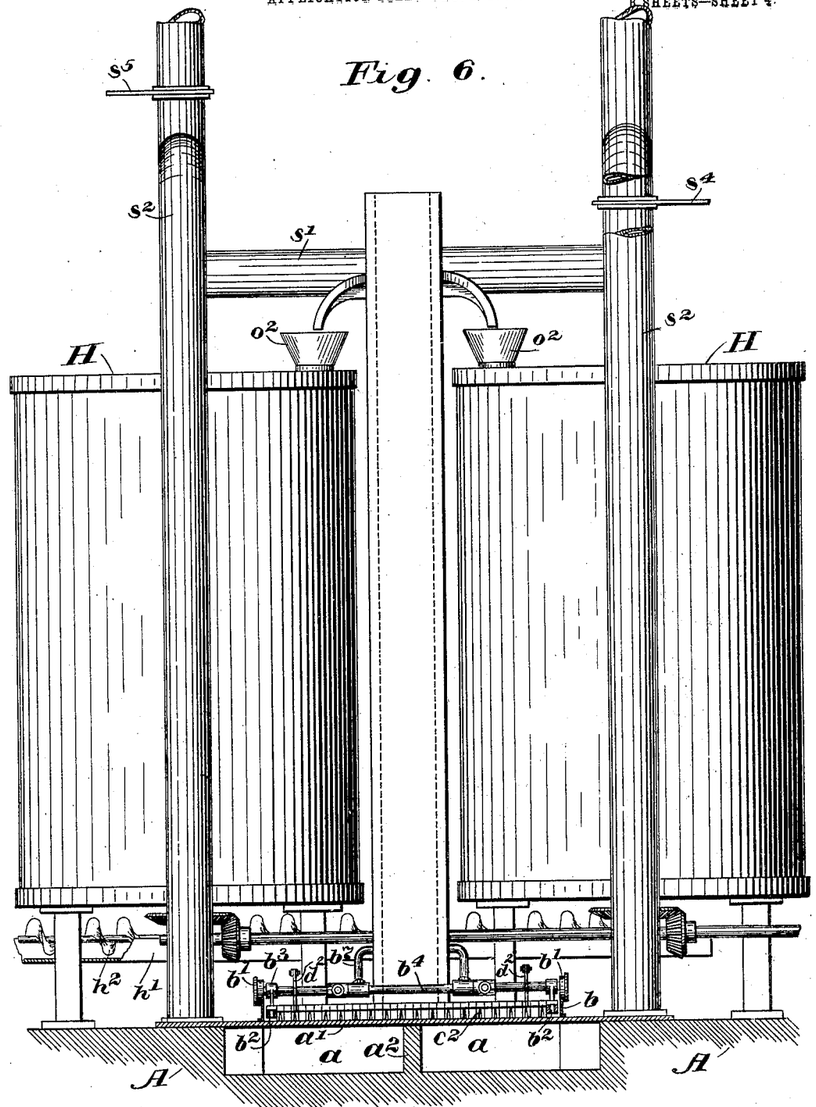
Fig. 6 is a vertical section on the dotted line 6 6, Fig. 1.

In this way it will be seen that from the time the ore is deposited in the first hopper $e$, Fig. 1, until the cinder is discharged from one of the cars $p$ upon the cinder pile no manual handling or labor is required for the operation of the various automatic appliances. The heated gases passing from the burners H here are shown as escaping through outlet pipes or conduits $s$, Figs. 1 and 5. These two pipes are connected by a transverse pipe $s'$, Fig. 6, and above this transverse connection each of the pipes $s$ is provided with a leg $s^2$, which extends downward to and enters the pit $a$ beneath the drier-table $a'$, one of said legs entering said pit at $a^3$, Fig. 7, the other at $a^4$. One of the outlets—viz., that at the right, Fig. 6—is provided between the horizontal connection $s'$ and the point of connection therewith of the leg $s^2$ with a slide or other suitable valve or damper $s^4$, whereby the said pipe may be cut off and the heated gas rising from the burner beneath caused to pass across through the horizontal pipe $s'$ into the other outlet-pipe $s$ at the other burner, where it joins the heated gas therefrom, the two flowing together down through the leg $s^2$, leading therefrom, into and through said pit $a$, escaping therefrom upward through the other leg $s^3$ and into the first-named outlet-pipe $s$ above the valve $s^4$ therein. Thus the heated gas from both burners circulates through the pit $a$ before escaping to the atmosphere. Another valve $s^5$ is placed in the outlet-pipe $s$, at the left, Fig. 6, but above the leg $s^2$ therein to prevent the heated gas escaping directly from the said pipe $s$ without first flowing downward to and through the pit $a$.

The drying apparatus (shown principally in Figs. 1 to 4) is not herein specifically claimed, since it is the subject-matter of another application pending concurrently herewith and because my invention is not limited to the use of this particular type of drying apparatus. Neither is my invention limited to the particular type or arrangement or number of burners H, nor to the particular kind of conveyers, either lifting or horizontal, (here shown,) nor to the particular means for discharging the material delivered from the second lifting-conveyer, (herein shown at $h^3$,) for my invention may be variously varied and embodied within the spirit and scope of the claims appended hereto.

While I have herein confined my description for convenience to the handling of ore, yet, as heretofore stated, my invention is not limited thereto.

The term "burner" as used in the claims is intended to cover any form of drying apparatus whether or not it is commonly termed a "burner," and whatever may be its construction and use, and the term "working apparatus" where used in the claims covers any type of apparatus of any construction and which performs any sort of work upon or in connection with the ore or other material operated upon whether it is a drier or not when used in connection with the other elements combined therewith in such claim.

Having described my invention and without limiting myself to details, what I claim, and desire to secure by Letters Patent, is—

1. In an apparatus for burning ore, the combination of a drier-surface for the ore, means for automatically feeding the ore intermittently along said surface, means for laterally shifting the ore during the feeding movement and during the interruptions in the feeding movement, a burner, and means to feed the ore from said drier-surface to said burner.

2. In an apparatus for burning ore the combination of a drier-surface for the ore, means for automatically feeding the ore intermittently along said surface, separate means for laterally shifting or turning the ore while on said surface during the feeding movement, a burner, means for passing heated gases from said burner into effective relation with said drier-surface, and means to feed the ore from said drier-surface to said burner.

3. In an apparatus for burning ore the combination of a drier-surface for the ore, means for automatically feeding the ore intermittently along said surface, means for laterally shifting or turning the ore while on said surface during said feeding movement and during interruptions therein, a burner, means for passing heated gases from said burner into effective relation with said drier-surface, and means to feed the ore from said drier-surface to said burner.

4. In an apparatus for burning ore the combination of a drier-surface for the ore, means for automatically feeding the ore intermittently along said surface, separate means for laterally shifting the ore during the feeding movement, a burner, and means to feed the ore from said drier-surface to the burner.

5. In an apparatus for burning ore the combination with a drier-surface for the ore, means for automatically feeding the ore intermittently along said surface, separate means for laterally shifting the ore upon said surface, a burner, and means to feed the ore from said drier-surface to said burner.

6. In an apparatus for burning ore, the combination of a drier-surface for the ore, means for automatically feeding the ore intermittently along said surface, separate means for shifting the ore in alternation to the right and left, a burner, and means to feed the ore from the drier-surface to said burner.

7. In an apparatus for burning ore the combination of a drier-surface for the ore, means for automatically feeding the ore intermittently along said surface, means for laterally shifting or turning the ore while on said surface during the feeding movement and during interruptions therein, a pair of burners, means to feed the ore from said drier-surface to both of said burners, means for leading the heated gases from said burners beneath said drier-surface, means for circulating said gases beneath said drier-surface, and means for mechanically discharging the cinder from said burners.

8. In an apparatus for burning ore the combination of a drier-surface for the ore, means for automatically feeding the ore intermittently along said surface, separate means for laterally shifting or turning the ore while on said surface during the feeding movement, a pair of burners, means to feed the ore from said drier-surface to both of said burners, means for leading the heated gases from said burners beneath said drier-surface, means for circulating said gases beneath said drier-surface, and means for mechanically discharging the cinder from said burners.

9. In an apparatus for burning ore, the combination of a power-driven burner, a drier-surface, means for automatically feeding the ore intermittently along said surface, means for laterally shifting the same while on said surface during the feeding movement and during interruptions therein, means for delivering the ore from said surface to the burner, and means for proportioning the feeding and delivering of the ore to the requirements of the burner.

10. In an apparatus for burning ore, the combination of a power-driven burner, a drier-surface, means for automatically feeding the ore intermittently along said surface, separate means for laterally shifting the same while on said surface during the feeding movement, means for delivering the ore from said surface to the burner, and means for proportioning the feeding and delivering of the ore to the requirements of the burner.

11. In an apparatus for burning ore the combination of a burner, a drier-surface, means for feeding ore along said drier-surface toward said burner, separate means for laterally shifting or turning said ore to expose new portions to the action of the heat without disturbing the longitudinal position thereof, means for delivering the ore from the drier-surface to the burner, and means for proportioning the feeding and delivering of the ore to the requirements of the burner.

12. In an apparatus for burning ore the combination of a drier-surface for the ore, means to feed the ore intermittently along said surface, means to laterally turn or shift the ore on said surface during the feeding movement and during interruptions therein, a burner, means to deliver the ore from the drier-surface to the burner, and means to proportion the feeding and delivering of the ore to the requirements of the burner.

13. In an apparatus for burning ore the combination of a drier-surface for the ore, means to deliver the ore to said surface, means intermittently to feed the ore along said surface, separate means laterally to turn or shift the ore on said surface during the feeding movement, a burner, means to deliver the ore from the drier-surface to the burner, and means to proportion the feeding and delivering of the ore to the requirements of the burner.

14. In an apparatus for burning ore the combination of a drier-surface for the ore, means to deliver the ore to said surface, means intermittently to feed the ore along said surface, means laterally to shift or turn the ore on said surface during the feeding movement and during interruptions therein, a burner, means to deliver ore from the drier-surface to the burner, means to proportion the feeding and delivering of the ore to the requirements of the burner, and means for conducting the heated gases from said burner beneath said drier-surface.

15. In an apparatus for burning ore the combination of a drier-surface for the ore, means to deliver the ore to said surface, means intermittently to feed the ore along said surface, means laterally to shift or turn the ore on said surface during the feeding movement, and during interruptions therein, a burner, means to deliver the ore from the drier-surface to the burner, means to proportion the feeding and delivering of the ore to the requirements of the burner, means for conducting the heated gases from said burner beneath said drier-surface and means to discharge the cinder from the burner.

16. In an apparatus for burning ore the combination of a drier-surface for the ore, means for feeding the ore intermittently along said surface, separate means for shifting the ore during the interruptions in the feeding movement, a burner, and means to feed the ore from the drier-surface to the burner.

17. In an apparatus for burning ore, the combination of a burner, a drier-surface, means for feeding ore along said surface toward said burner, separate means for laterally turning or shifting said ore to expose new portions to the action of the heat during the feeding movement without disturbing the longitudinal position thereof, and means for delivering the ore from the drier-surface to the burner.

18. In an apparatus for burning ore the combination of a burner, a drier-surface, means for feeding ore along said drier-surface to said burner and comprising reciprocatory plates mounted to feed material in one direction of reciprocation and to yieldingly pass over the same in the return reciprocation, means for laterally turning or shifting said ore to expose new portions to the action of the heat without disturbing the longitudinal position thereof, and means for delivering the ore from the drier-surface to the burner.

19. In an apparatus for burning ore the combination of a drier-surface for the ore, means for feeding the ore intermittently along said surface, means for laterally shifting the ore alternately to the right and left, a burner and means to feed the ore from the drier-surface to the burner.

20. In an apparatus for burning ore the combination of a drier-surface for the ore, means to feed the ore along said surface, means to shift the ore alternately to the right and left upon said surface, a burner, and means to feed the ore from the drier-surface to the burner.

21. In an apparatus for burning ore the combination of a drier-surface for the ore, means for feeding the ore intermittently along said surface, said means comprising reciprocating feeding devices mounted to feed the material in one direction of reciprocation and to yieldingly pass over the same in the return reciprocation, separate means to laterally shift the ore in one direction during the said feeding movement of reciprocation and laterally to shift the ore in the opposite direction during said return reciprocation, and means to deliver the ore from the drier-surface to the burner.

In testimony whereof I have signed my name to this specification in the presence of two subscribing witnesses.

JOHN HICKEY.

Witnesses:
SHEPARD KIMBERLY,
GEO. C. BINGHAM.